US012636782B2

(12) United States Patent
Lee

(10) Patent No.: US 12,636,782 B2
(45) Date of Patent: May 26, 2026

(54) APPARATUS AND METHOD FOR EVALUATING SPEED REDUCER FOR ROBOT

(71) Applicant: Hyundai Transys Inc., Seosan-si (KR)

(72) Inventor: Sang Gi Lee, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 58 days.

(21) Appl. No.: 18/648,677

(22) Filed: Apr. 29, 2024

(65) Prior Publication Data

US 2025/0026012 A1     Jan. 23, 2025

(30) Foreign Application Priority Data

Jul. 21, 2023     (KR) ......................... 10-2023-0095252

(51) Int. Cl.
B25J 9/16         (2006.01)
(52) U.S. Cl.
CPC ............. B25J 9/1651 (2013.01); B25J 9/163 (2013.01); B25J 9/1674 (2013.01)
(58) Field of Classification Search
CPC ........ B25J 9/1651; B25J 9/163; B25J 9/1674; B25J 19/0095; G01M 13/025; G01M 13/02; G06F 18/241; G06N 3/044; G06N 20/00
See application file for complete search history.

(56) References Cited

U.S. PATENT DOCUMENTS

2017/0293862 A1* 10/2017 Kamiya ............. G01N 29/4436
2020/0061834 A1*  2/2020 Kanazawa ............. B25J 9/1674
2021/0178615 A1*  6/2021 Tanaka ............... G05B 13/0265

FOREIGN PATENT DOCUMENTS

| | | | |
|---|---|---|---|
| JP | H11129186 A | * | 5/1999 |
| JP | 2017188030 A | | 10/2017 |
| JP | 2022113522 A | | 8/2022 |

(Continued)

OTHER PUBLICATIONS

Office Action dated Jul. 18, 2025 in Korean Application No. 10-2023-0095252 (with English translation).

(Continued)

*Primary Examiner* — Dylan M Katz

(74) *Attorney, Agent, or Firm* — SALIWANCHIK, LLOYD & EISENSCHENK

(57)         ABSTRACT

The present disclosure discloses an apparatus and method for evaluating a speed reducer for a robot. An apparatus for evaluating a speed reducer for a robot of the present disclosure includes a motor state input module configured to receive a driving state of a drive motor connected directly to a speed reducer, a storage device, a memory configured to store an executable program, and a processor operatively coupled to the motor state input module, the storage device, and the memory, in which the processor receives a drive current and a rotational speed from the motor state input module, establishes big data, stores the big data in the storage device, establishes a learning model for evaluating the speed reducer on the basis of the drive current and the rotational speed stored in the storage device, performs machine learning, and then diagnoses abnormality of the speed reducer on the basis of the diagnosis learning model by means of the inputted drive current and the inputted rotational speed.

12 Claims, 2 Drawing Sheets

(56)  References Cited

FOREIGN PATENT DOCUMENTS

| JP | 2022-141526 | A | 9/2022 |
| KR | 20160083392 | A | 7/2016 |
| WO | 2020031225 | A1 | 2/2020 |

OTHER PUBLICATIONS

Notice of Allowance dated Oct. 21, 2025 in Japanese Application No. 2024-063129 (with English translation).

* cited by examiner

APPARATUS AND METHOD FOR EVALUATING SPEED REDUCER FOR ROBOT

CROSS-REFERENCE TO RELATED APPLICATION

This application claims the benefit of Korean Patent Application No. 10-2023-0095252, filed on Jul. 21, 2023, the disclosure of which is incorporated by reference herein in its entirety.

BACKGROUND

Field

Exemplary embodiments of the present disclosure relate to an apparatus and method for evaluating a speed reducer for a robot, and more particularly, to an apparatus and method for evaluating a speed reducer for a robot, which are capable of detecting an electric current applied to a drive motor connected directly to a speed reducer for a robot and a speed of the drive motor and performing learning on the basis of machine learning to diagnose a breakdown and predict a lifespan.

Discussion of the Background

In general, an industrial robot refers to a handling machine that is particularly programmable related to orientations, positions, and work progress with respect to a plurality of motion axes in a state in which the handling machine is equipped with tools adapted to the purpose of automatically handling an object.

Such an industrial robot includes a tool configured to perform a manufacturing process on an object, a wrist part on which the tool is installed, arm and upper units configured to change a position of the wrist part, a pivoting part configured to rotate about a pivoting axis to change a direction in which the wrist part is directed, a base part configured to support the pivoting part, and a drive part configured to provide driving power for performing the manufacturing process.

In this case, the drive part may include a drive motor and a speed reducer, and lubricating oil for lubrication is accommodated in the speed reducer. A constituent material of the speed reducer is iron, and the constituent material is mixed with the lubricating oil when the speed reducer is abraded in accordance with an operating time of the drive part. The foreign substances mixed with the lubricating oil causes a sudden erroneous operation of the speed reducer during the manufacturing process. In order to cope with the erroneous operation, all of the plurality of industrial robots installed on the process line need to be stopped.

The background technology of the present disclosure is disclosed in Korean Patent Application Laid-Open No. 10-2016-0083392 (published on Jul. 12, 2016, entitled 'Industrial Robot System').

SUMMARY

Because the speed reducer and the drive motor are in direct contact with each other, excessive heat of the drive motor is transferred through a speed reducer housing and affects the speed reducer in the event of the erroneous operation of the speed reducer of the industrial robot, and there is a concern that an encoder of the drive motor is damaged by high-temperature heat of the drive motor. In addition, in case that the high-temperature heat of the drive motor is transferred through the speed reducer housing, there is a problem in that a lifespan of lubricating grease in the speed reducer housing is shortened.

Various embodiments are directed to an apparatus and method for evaluating a speed reducer for a robot, which are capable of detecting a speed of and an electric current applied to a drive motor connected directly to a speed reducer for a robot and performing learning on the basis of machine learning to diagnose a breakdown and predict a lifespan.

In an embodiment, an apparatus for evaluating a speed reducer for a robot includes: a motor state input module configured to receive a driving state of a drive motor connected directly to a speed reducer; a storage device; a memory configured to store an executable program; and a processor operatively coupled to the motor state input module, the storage device, and the memory, in which the processor receives a drive current and a rotational speed from the motor state input module, establishes big data, stores the big data in the storage device, establishes a learning model for evaluating the speed reducer on the basis of the drive current and the rotational speed stored in the storage device, performs machine learning, and then diagnoses abnormality of the speed reducer on the basis of the diagnosis learning model by means of the inputted drive current and the inputted rotational speed.

In the present disclosure, the apparatus may further include: an output module configured to output a diagnosis result, in which the processor outputs the diagnosis result of diagnosing the abnormality of the speed reducer through the output module.

In the present disclosure, the motor state input module may receive the drive current and the rotational speed through a network from a motor driver configured to operate the drive motor.

In the present disclosure, the processor may output a result of evaluating the speed reducer to a motor driver.

In the present disclosure, the processor may store a result of evaluating the speed reducer in the storage device and periodically improve the diagnosis learning model.

In another embodiment, a method of evaluating a speed reducer for a robot includes: receiving, by a processor, a drive current and a rotational speed of a drive motor through a motor state input module; establishing, by the processor, big data on the basis of the inputted drive current and the inputted rotational speed and storing the big data in a storage device; establishing, by the processor, a learning model for evaluating a speed reducer on the basis of the drive current and the rotational speed and performing machine learning; and diagnosing, by the processor, abnormality of the speed reducer on the basis of the diagnosis learning model by means of the drive current and the rotational speed inputted from the motor state input module.

In the present disclosure, the method may further include: outputting, by the processor, a diagnosis result of diagnosing the abnormality of the speed reducer through an output module.

In the present disclosure, the method may further include: outputting, by the processor, a result of evaluating the speed reducer to a motor driver.

In the present disclosure, the method may further include: storing, by the processor, a result of evaluating the speed reducer in the storage device and periodically improving the diagnosis learning model.

The apparatus and method for evaluating a speed reducer for a robot according to one aspect of the present disclosure may detect the speed of and the electric current applied to the drive motor connected directly to the speed reducer for a robot, diagnose a breakdown by performing learning on the basis of the machine learning, predict the lifespan, and provide the diagnosis result to the motor driver to allow the motor driver to perform the operation of protecting the drive motor.

DETAILED DESCRIPTION OF THE ILLUSTRATED EMBODIMENTS

Figure 1:
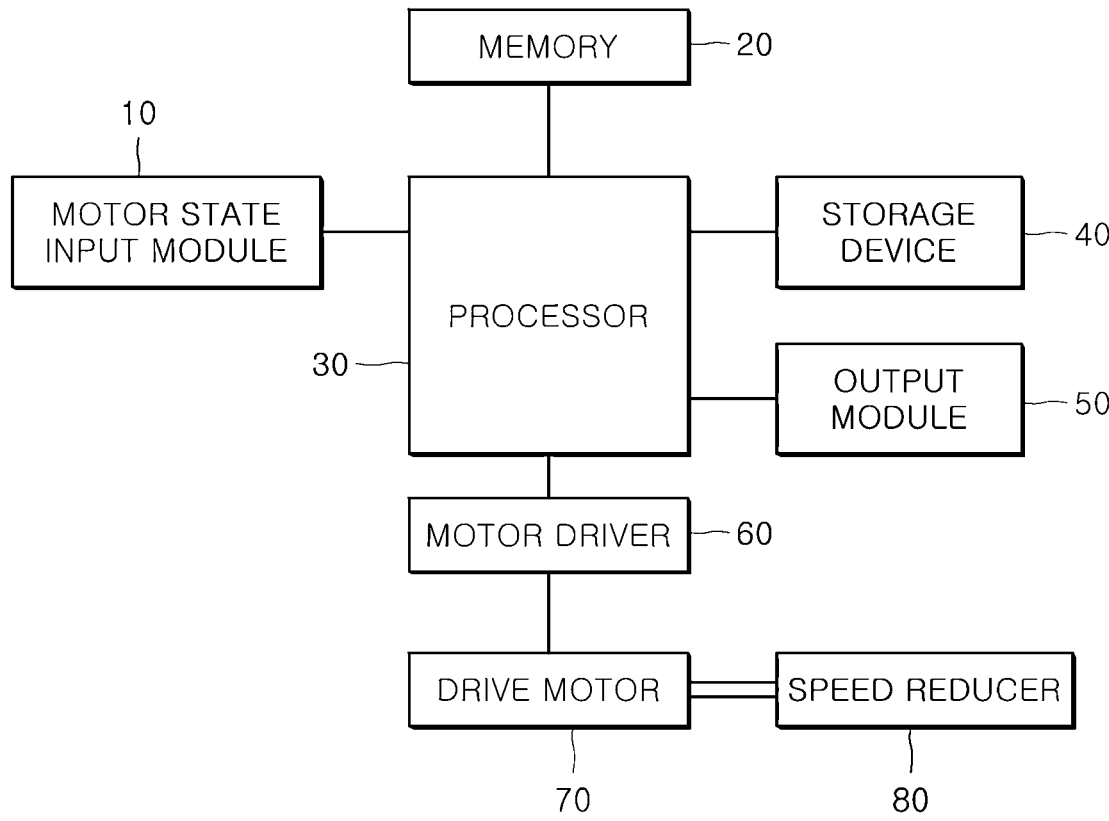
FIG. 1 is a block configuration view illustrating an apparatus for evaluating a speed reducer for a robot according to an embodiment of the present disclosure.

Hereinafter, an apparatus and method for evaluating a speed reducer for a robot will be described below with reference to the accompanying drawings through various exemplary embodiments. Here, thicknesses of lines, sizes of constituent elements, or the like illustrated in the drawings, may be exaggerated for clarity and convenience of description. In addition, the terms used below are defined in consideration of the functions in the present disclosure and may vary depending on the intention of a user or an operator or a usual practice. Therefore, such terms should be defined based on the entire contents of the present specification.

FIG. 1 is a block configuration view illustrating an apparatus for evaluating a speed reducer for a robot according to an embodiment of the present disclosure.

As illustrated in FIG. 1, an apparatus for evaluating a speed reducer for a robot according to an embodiment of the present disclosure may include a motor state input module 10, a storage device 40, an output module 50, a memory 20, and a processor 30.

The motor state input module 10 may receive a driving state of a drive motor 70 connected directly to a speed reducer 80.

The driving state of the drive motor 70 may include a drive current applied to operate the drive motor 70, and a rotational speed of the drive motor 70.

In this case, the motor state input module 10 may be connected to a motor driver 60, which controls the operation of the drive motor 70, through a network and receive the drive current and the rotational speed from the motor driver 60.

The storage device 40 may establish and store big data related to the drive current and the rotational speed of the drive motor 70 inputted through the motor state input module 10.

In this case, the storage device 40 may collect the drive current and the rotational speed in a normal state for establishing a diagnosis learning model and establish and store the big data.

The output module 50 provides an interface for outputting a diagnosis result. The output module 50 may not only output the diagnosis result to a high-level control device (not illustrated) but also output the diagnosis result to a display (not illustrated).

The memory 20 may store data and executable programs for diagnosing abnormality of the speed reducer for a robot, and the stored pieces of information may be selected by the processor 30, as necessary.

That is, the memory 20 stores various types of data produced during a process of executing an operating system or an application (a program or an applet) for operating the apparatus for evaluating a speed reducer for a robot. In this case, the memory 20 is collectively referred to as a non-volatile storage device configured to continuously maintain the stored information even though no electric power is supplied, and a volatile storage device configured to require electric power to maintain the stored information. In addition, the memory 20 may serve to temporarily or permanently store data to be processed by the processor 30. In this case, the memory 20 may include magnetic storage media or flash storage media in addition to the volatile storage device configured to require electric power to maintain the stored information. However, the scope of the present disclosure is not limited thereto.

The processor 30 may be operatively coupled to the motor state input module 10, the storage device 40, the output module 50, and the memory 20, copy various types of programs, which are stored in the memory 20, in an RAM, and execute the programs to perform various types of operations to control an overall operation of the apparatus for evaluating a speed reducer for a robot.

In various embodiments, the processor 30 may be implemented as a digital signal processor (DSP), a microprocessor, or a time controller (TCON) that processes a digital signal. However, the present disclosure is not limited thereto. The processor 30 may include or be defined as the terms of one or more of a central processing unit (CPU), a microcontroller unit (MCU), a micro-processing unit (MPU), a controller, an application processor (AP), a communication processor (CP), and an ARM processor. In addition, the processor 30 may be implemented as a system-on-chip (SoC), which is embedded with a processing algorithm, or large-scale integration (LSI) or implemented in the form of a field programmable gate array (FPGA).

That is, the processor 30 executes the executable diagnosis program stored in the memory 20, receives the drive current and the rotational speed from the motor state input module 10, establishes the big data, and stores the big data in the storage device 40.

Thereafter, the processor 30 may establish a learning model, which is used to evaluate the speed reducer 80 on the basis of an artificial neural network, on the basis of the drive current and the rotational speed stored in the storage device 40 and perform the machine learning. Then, the processor 30 may diagnose the abnormality of the speed reducer on the basis of the diagnosis learning model by means of the inputted drive current and the inputted rotational speed and predict the lifespan.

In addition, the processor 30 may store the result of evaluating the speed reducer 80 in the storage device 40 and periodically improve the diagnosis learning model.

In this case, the artificial neural network (ANN) refers to a machine learning algorithm made by mathematically modeling a learning method of a brain that stores information by a process of sending or receiving information through neurons and synapses for connecting the neurons. The neuron may be defined as a node and the synapse may be defined as a weight value in the artificial neural network.

The artificial neural network may include any one of a deep neural network (DNN), a recurrent neural network (RNN), and a convolutional neural network (CNN). Furthermore, the artificial neural network may be created by combining at least one of the deep neural network (DNN) and the recurrent neural network (RNN). In addition, various deep learning algorithms may be applied in addition to the above-mentioned artificial neural network. The deep neural network (DNN) may be an artificial neural network with multiple hidden layers, and the recurrent neural network (RNN) may be a neural network with a recurrent structure that differs from the deep neural network (DNN). The recurrent neural network (RNN) may be an appropriate neural network for analyzing time series data because the RNN remembers past information and applies the information to learning by storing data in a hidden layer and recursively using the data for the next learning.

As described above, the processor 30 may diagnose the abnormality of the speed reducer 80 on the basis of the diagnosis learning model by means of the drive current and the rotational speed on the basis of the diagnosis learning model and output the diagnosis result through the high-level control device or the display through the output module 50.

In addition, the processor 30 may output the result of evaluating the speed reducer 80 to the motor driver 60, and the motor driver 60 may perform a protection operation by controlling the drive motor 70 in accordance with the abnormal state and lifespan of the speed reducer 80.

As described above, the apparatus for evaluating a speed reducer for a robot according to the embodiment of the present disclosure may detect the speed of and the electric current applied to the drive motor connected directly to the speed reducer for a robot, diagnose a breakdown by performing learning on the basis of the machine learning, predict the lifespan, and provide the diagnosis result to the motor driver to allow the motor driver to perform the operation of protecting the drive motor.

Figure 2:
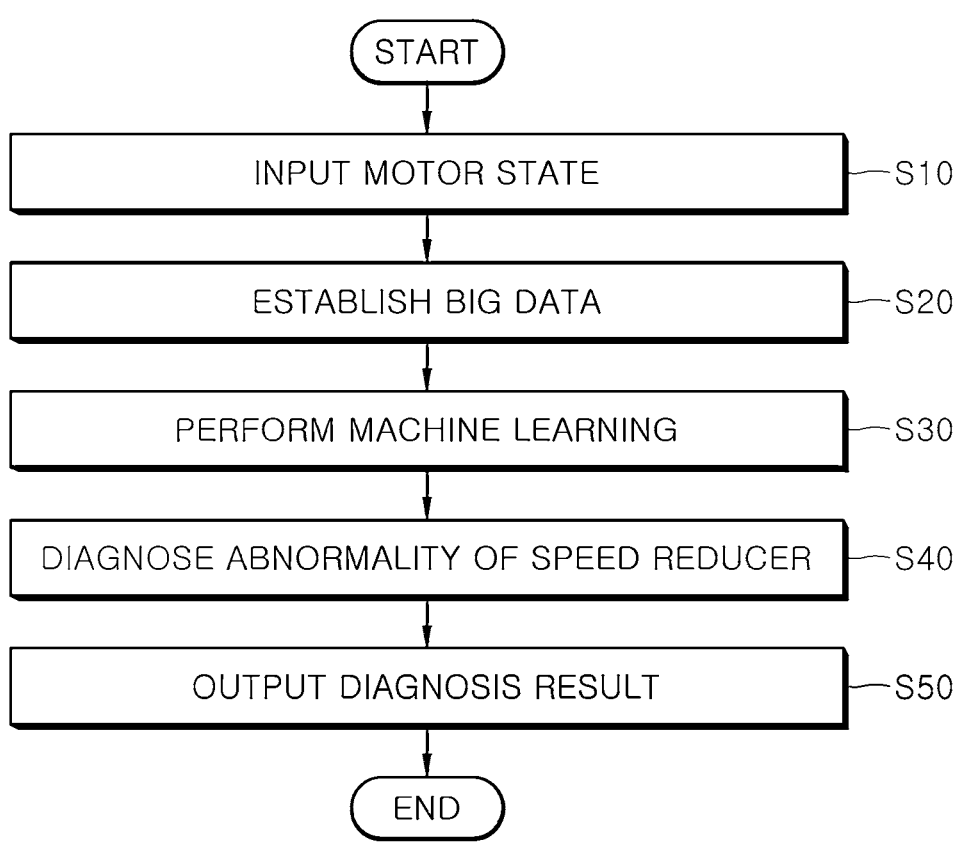
FIG. 2 is a flowchart for explaining a method of evaluating a speed reducer for a robot according to another embodiment of the present disclosure.

FIG. 2 is a flowchart for explaining a method of evaluating a speed reducer for a robot according to another embodiment of the present disclosure.

As illustrated in FIG. 2, first, in the method of evaluating a speed reducer for a robot according to the embodiment of the present disclosure, the processor 30 receives the drive current and the rotational speed of the drive motor 70 through the motor state input module 10 (S10).

In this case, the motor state input module 10 may be connected to the motor driver 60, which controls the operation of the drive motor 70, through the network and receive the drive current and the rotational speed from the motor driver 60.

When the processor 30 receives the drive current and the rotational speed of the drive motor 70 in step S10, the processor 30 establishes the big data on the basis of the inputted drive current and the inputted rotational speed and stores the big data in the storage device 40 (S20).

After the processor 30 establishes the big data on the basis of the drive current and the rotational speed in step S20, the processor 30 establishes the learning model for evaluating the speed reducer 80 on the basis of the artificial neural network with respect to the big data stored in the storage device 40 and performs the machine learning (S30).

In this case, the artificial neural network (ANN) refers to a machine learning algorithm made by mathematically modeling a learning method of a brain that stores information by a process of sending or receiving information through neurons and synapses for connecting the neurons. The neuron may be defined as a node and the synapse may be defined as a weight value in the artificial neural network.

After the processor 30 performs the machine learning in step S30, the processor 30 diagnoses abnormality of the speed reducer 80 on the basis of the diagnosis learning model with respect to the drive current and the rotational speed inputted through the motor state input module 10 (S40).

After the processor 30 diagnoses the abnormality of the speed reducer 80 in step S40, the processor 30 outputs the diagnosis result of diagnosing the abnormality of the speed reducer 80 to the high-level control device (not illustrated) through the output module 50 or outputs the diagnosis result through the display (not illustrated) (S50).

In addition, the processor 50 may store the diagnosis result in the storage device 40 and then periodically improve the diagnosis learning model.

Meanwhile, the processor 50 may output the result of evaluating the speed reducer 80 to the motor driver 60, and the motor driver 60 may perform the protection operation by controlling the drive motor 70 in accordance with the abnormal state and lifespan of the speed reducer 80.

As described above, the method of evaluating a speed reducer for a robot according to the embodiment of the present disclosure may detect the speed of and the electric current applied to the drive motor connected directly to the speed reducer for a robot, diagnose a breakdown by performing learning on the basis of the machine learning, predict the lifespan, and provide the diagnosis result to the motor driver to allow the motor driver to perform the operation of protecting the drive motor.

For example, the configurations described in the present specification may be implemented as methods or processes, devices, software programs, data stream, or signals. Even though the implementation of the single form is described (e.g., only the method is described), the described features may also be implemented in other forms (e.g., devices or programs). The device may be implemented as appropriate hardware, software, firmware, and the like. For example, the method may be implemented by devices such as processors that generally refer to processing devices including computers, microprocessors, integrated circuits, programmable logic devices, or the like. The processors also include communication devices such as computers, cellular phones, portable/personal information terminals (personal digital assistants (PDA)), and other devices that facilitates information communication with final users.

While the present disclosure has been described with reference to the embodiments depicted in the drawings, the embodiments are for illustrative purposes only, and those skilled in the art to which the present technology pertains will understand that various modifications of the embodiments and any other embodiments equivalent thereto are available.

Accordingly, the true technical protection scope of the present disclosure should be determined by the appended claims.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus for evaluating a speed reducer for a robot, the apparatus comprising:

a motor state input module configured to receive a driving state of a drive motor connected directly to a speed reducer;

a storage device;

a memory configured to store an executable program; and a processor operatively coupled to the motor state input module, the storage device, and the memory, wherein the processor receives a drive current and a rotational speed from the motor state input module, establishes big data, stores the big data in the storage device, establishes a diagnosis learning model for evaluating the speed reducer on the basis of the drive current and the rotational speed stored in the storage device, performs machine learning, and then generates a diagnosis result by diagnosing abnormality of the speed reducer using the diagnosis learning model, the drive current, and the rotational speed, wherein the diagnosis result is output to a motor driver to perform a protection operation of the drive motor, wherein the motor state input module receives the drive current and the rotational speed through a network from the motor driver that is configured to operate the drive motor, wherein the diagnosis learning model is an artificial neural network (ANN) comprising at least one of a deep neural network (DNN), a recurrent neural network (RNN), or a convolutional neural network (CNN), and wherein the diagnosis result comprises a predicted lifespan of the speed reducer.

2. The apparatus of claim 1, further comprising:

an output module configured to output the diagnosis result, wherein the processor outputs the diagnosis result through the output module.

3. The apparatus of claim 1, wherein the processor stores a result of evaluating the speed reducer in the storage device and periodically improves the diagnosis learning model.

4. A method of evaluating a speed reducer for a robot, the method comprising:

receiving, by a processor, a drive current and a rotational speed of a drive motor through a motor state input module;

establishing, by the processor, big data on the basis of the drive current and the rotational speed and storing the big data in a storage device;

establishing, by the processor, a diagnosis learning model for evaluating the speed reducer on the basis of the drive current and the rotational speed and performing machine learning; and generating, by the processor, a diagnosis result by diagnosing abnormality of the speed reducer using the diagnosis learning model, the drive current, and the rotational speed received from the motor state input module, wherein the diagnosis result is output to a motor driver to perform a protection operation of the drive motor, wherein the motor state input module receives the drive current and the rotational speed through a network from the motor driver that is configured to operate the drive motor, wherein the diagnosis learning model is an artificial neural network (ANN) comprising at least one of a deep neural network (DNN), a recurrent neural network (RNN), or a convolutional neural network (CNN), and wherein the diagnosis result comprises a predicted lifespan of the speed reducer.

5. The method of claim 4, further comprising:

outputting, by the processor, the diagnosis result through an output module.

6. The method of claim 4, further comprising:

storing, by the processor, a result of evaluating the speed reducer in the storage device and periodically improving the diagnosis learning model.

7. The method of claim 4, wherein the ANN comprises the DNN and the RNN.

8. The method of claim 7, wherein the DNN comprises multiple hidden layers, and wherein the RNN has a recurrent structure that differs from a structure of the DNN.

9. The method of claim 4, wherein the ANN comprises the DNN, and wherein the DNN comprises multiple hidden layers.

10. The system of claim 1, wherein the ANN comprises the DNN and the RNN.

11. The system of claim 10, wherein the DNN comprises multiple hidden layers, and wherein the RNN has a recurrent structure that differs from a structure of the DNN.

12. The system of claim 1, wherein the ANN comprises the DNN, and wherein the DNN comprises multiple hidden layers.

* * * * *